United States Patent Office 3,100,229
Patented Aug. 6, 1963

3,100,229
SULFUR BRIDGED CYCLOHEXYL PHENOLS
Harold D. Orloff, Oak Park, Mich., assignor to Ethyl Corporation, New York, N.Y., a corporation of Virginia
No Drawing. Filed Apr. 1, 1960, Ser. No. 19,140
7 Claims. (Cl. 260—609)

The present invention deals in general with a novel class of sulfur-containing phenolic compounds and their use as antioxidants. More particularly, this invention is concerned with a novel and unusual class of substituted phenolic compounds and the employment of these compounds as stabilizers and antioxidants for organic material and particularly saturated hydrocarbon polymers.

It is an object of this invention to provide a novel class of chemical compounds. A further object of this invention is to provide novel compositions of matter comprising organic material stabilized against oxidative deterioration. A particular object of this invention is to provide high molecular weight saturated hydrocarbon polymers of enhanced stability.

The above and other objects of this invention are accomplished by a phenolic compound having the formula:

(I)
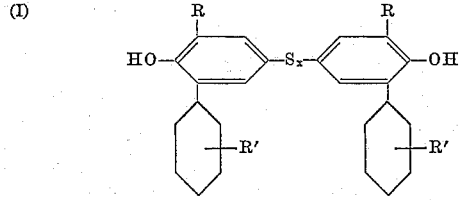

where R is an organic hydrocarbon radical having from one to about 18 carbon atoms, R' is hydrogen or an alkyl radical having from one to about 9 carbon atoms and $x$ has a value from 1–3 inclusive. These compounds are crystalline solids, glasses, or high boiling liquids and have the advantage of good solubility in a large number of organic solvents. Examples of compounds of this invention include 4,4'-thiobis(2-tert-octyl-6-cyclohexylphenol), 4,4'-dithiobis(2-sec-eicosyl-6-cyclohexylphenol), 4,4'-thiobis[2-($\alpha$,$\alpha$-diisopropyl-p-nonylbenzyl)-6-(p-isopropyl cyclohexyl)phenol], 4,4'-trithiobis[2-tert-amyl-6-(o-methylcyclohexyl)phenol], 4,4'-thiobis(2-methyl-6-cyclohexylphenol), 4,4'-trithiobis(2-ethyl-6-cyclohexylphenol), 4,4'-trithiobis(2-tert-butyl-6-cyclohexylphenol), 4,4'-dithiobis (2-isopropyl-6-cyclohexylphenol), and 4,4'-thiobis[2-hexyl-6-(p-cyclohexylcyclohexyl)phenol].

These compounds are particularly suited as antioxidants since they possess the requisite properties of solubility, compatibility and volatility in addition to exhibiting a high degree of antioxidant effectiveness. These properties are in part provided by the o-cyclohexyl group and the sulfur bridge in the position para to the hydroxyl group. To illustrate the importance of the properties of volatility and solubility, the role of an antioxidant in polyethylene may be cited. Compatibility is of great importance; if the antioxidant is not compatible with the polymer it will not perform its function. Volatility is important in polyethylene; an antioxidant with insufficient volatility will not migrate to the surface to combat the main source of oxygen attack.

When the compounds of this invention are employed in a solid hydrocarbon polymer such as polyethylene or polypropylene, outstanding results are surprisingly obtained. That these results are particularly surprising is borne out by the fact that certain prior art phenolic compounds containing cyclohexyl groups are almost ineffective.

A preferred embodiment of this invention is a compound having the formula:

(II)
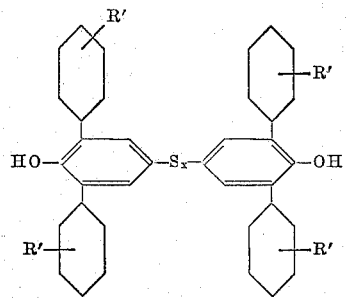

where R' is as defined above. These compounds are preferred as they may be prepared from 2,6-dicyclohexyl phenols which in turn may be made from phenol in a single reaction step. Among the compounds represented by Formula II are: 4,4'-thiobis[2,6-di(o-ethylcyclohexyl) phenol], 4,4'-dithiobis(2,6-dicyclohexylphenol), 4,4'-thiobis[2,6-di(p-isopropylcyclohexyl)phenol], and 4,4'-trithiobis[2-cyclohexyl-6-(3-methylcyclohexyl)phenol].

Another preferred embodiment of this invention consists of those compounds in which R in Formula I above is an alkyl group having from one to 4 carbon atoms and R' is hydrogen. The particularly preferred alkyl groups represented by R are the methyl group, the isopropyl group and the tertiary butyl group. These are preferred because of their outstanding antioxidant activity. These preferred compounds include 4,4'-thiobis(6-cyclohexyl-o-cresol), 4,4'-dithiobis(2-tert-butyl-6-cyclohexylphenol), and 4,4'-trithiobis(2-isopropyl-6-cyclohexylphenol).

Another preferred embodiment of this invention is a compound according to Formula I above in which the value of $x$ is one. These monothiobis compounds are especially preferred as they are very readily prepared and are particularly non-corrosive to metals with which they come into contact.

Some of the advantages of the compounds of this invention may be illustrated by their function as antioxidants in synthetic saturated hydrocarbon polymers.

The saturated hydrocarbon synthetic polymers which achieve greatly enhanced oxidative stability by the practice of this invention include homopolymers and copolymers obtained from the polymerization of a hydrocarbon monoolefin (or mixtures) having up to 4 carbon atoms. Examples of such monomers include ethylene, propylene, butylene and isobutylene. Thus the polymers are homopolymers and copolymers of ethylene, propylene, butylene and isobutylene.

A preferred embodiment of this invention is polyethylene containing a small antioxidant quantity, up to about 5 percent, of a compound of this invention. A particularly preferred embodiment comprises polyethylene containing from about 0.02 to about 2 percent of such a compound. This embodiment is particularly preferred since polymeric compositions of outstanding oxidative stability result from the employment of the compounds in polyethylene in these quantities.

Polyethylene is a hydrocarbon polymer derived from the polymerization of ethylene. This polymerization can be accomplished by a great variety of methods which lead to products of diverse properties. Polyethylene of any nature may advantageously be utilized for preparing compositions according to the present invention. The polymers of ethylene which are employed may, for example, be similar to those which may be obtained by polymerizing ethylene in a basic aqueous medium and in the presence of polymerization-favoring quantities of oxygen under relatively high pressures in excess of 500 or 1,000 atmospheres at temperatures between 150 and 275° C. Or, if desired, they may be similar or identical to the essentially linear and unbranched polymers ordinarily having greater molecular weights which may be obtained under relatively low pressures of 1–100 atmospheres using such catalysts to polymerize the ethylene as mixtures of strong reducing agents and compounds of group IVB, VB and VIB metals of the periodic system; chromium oxide on silicated alumina hexavalent molybdenum compounds; and charcoal supported nickel-cobalt. The polyethylene which results from these various polymerization processes may have a molecular weight in the range from 1300 to over 1,000,000 depending on the particular conditions of polymerization employed.

EXAMPLE 1

The benefits deriving from the practice of this invention are demonstrated by comparative oxidation tests of polyethylene containing an antioxidant of this invention and polyethylene containing a prior art additive. These tests are conducted as follows: The selected amount of antioxidant is blended with the polyethylene by milling a weighed quantity of plastic pellets on a warm roll-mill. The weighed quantity of antioxidant is added to the mill after the polyethylene has been pre-milled for a short period of time. The plastic containing the antioxidant is then added in weighed quantity to a standard size vessel and melted to give a surface of reproducible size. The vessel is then inserted into a chamber which may be sealed and which is connected to a capillary tube leaded to a gas buret and leveling bulb. The apparatus is flushed with oxygen at room temperature, sealed, and the temperature is raised to 150° C. The oxygen pressure is maintained at one atmosphere by means of a leveling bulb. The oxygen up-take at the elevated temperature is recorded until sharp increase in oxygen up-take occurs. This procedure has been adopted since it has been found that many compounds may inhibit the oxidation for a certain induction period after which time a very sharp increase in the rate of oxygen up-take occurs indicating that the antioxidant has been exhausted. In tests of this nature it is found that the compositions of this invention have greatly increased "induction periods." For example, a sample of polyethylene with 0.05 weight percent of 2-cyclohexyl-6-tert-butyl-p-cresol antioxidant was tested according to this procedure and was found to take up oxygen rapidly with a very short initial induction period. The induction period was about 6 hours and after 23.5 hours of heating, over 60 milliliters of oxygen had been absorbed. When, however, 0.05 percent of 4,4'-thiobis(6-cyclohexyl-o-cresol) was added to an equal quantity of the same polyethylene, less than 2 milliliters of oxygen were taken up after 50 hours of heating. The induction period before a sudden increase in oxygen up-take was over 55 hours. This test indicates that 4,4'-thiobis(6-cyclohexyl-o-cresol) is an outstanding antioxidant for polyethylene.

There are several methods available for preparing the inhibited hydrocarbon polymer compositions of this invention. Thus the blending of the antioxidant with a polymer such as, for example, polyethylene, may be carried out on open rolls, on internal mixers or may be accomplished by mixing with extrusion. It is also possible to prepare concentrated batches of the polymer containing excessive amounts of the antioxidant and then mix the concentrate with additional polymer to prepare a composition of this invention. The preferred method of compounding the polymers is by milling on heated open rolls at slightly elevated temperatures by methods well-known to the art. The temperature range employed is sometimes critical as certain polyethylenes will not melt at low temperatures and tend to stick to the rolls at high temperatures. The additive may be initially mixed with the polymer in the dried state or it may be first dissolved in a suitable solvent, then sprayed on the polymer and milled in.

Other examples of the hydrocarbon polymer compositions of this invention prepared as described above follow. All parts and percentages are by weight in these examples.

EXAMPLE 2

To 1,000 parts of polyethylene produced by oxygen catalyzed reaction under a pressure of 20,000 atmospheres and having an average molecular weight of 40,000 is added and mixed 2 parts of 4,4'-dithiobis(2-isopropyl-6-cyclohexylphenol). The resulting composition has greatly increased oxidative stability.

EXAMPLE 3

With 200 parts of polyisobutylene having an average molecular weight of 100,000 is blended 1.0 part of 4,4'-dithiobis(2,6-dicyclohexylphenol).

EXAMPLE 4

To a master batch of high molecular weight polyethylene having an average molecular weight of about 1,000,000, a tensile strength of 6,700 p.s.i., a Shore D hardness of 74 and a softening temperature under low load of 150° C. is added 5 percent of 4,4'-thiobis[6-(p-octylcyclohexyl)-o-cresol].

EXAMPLE 5

A linear polyethylene having a high degree of crystallinity (about 93 percent) and below one ethyl branched chain per 100 carbon atoms, a density of about 0.96 gram per milliliter and which has about 1.5 double bonds per 100 carbon atoms is treated with $50 \times 10^{-6}$ roentgens of $\beta$-radiation. To the thus irradiated polymer is added 0.005 percent of 4,4'-trithiobis(2,6-dicyclohexylphenol) and the resulting product has better stability characteristics.

EXAMPLE 6

To a polyethylene having an average molecular weight of 1500, a melting point of 88–90° C. and a specific gravity of 0.92 is added one percent of 4,4'-thiobis(6-cyclohexyl-o-cresol). After milling in the antioxidant an extremely oxidative resistant product results.

EXAMPLE 7

Two parts of 4,4'-dithiobis(6-cyclohexyl-o-cresol) are added with milling to 100 parts of a low density polyethylene prepared by high pressure polymerization and which has an average molecular weight of about 20,000. The resulting product is vastly improved in its oxidative stability.

EXAMPLE 8

To 10,000 parts of a polyethylene having an average molecular weight of about 100,000 and which has a tensile strength of 5400 p.s.i., a Shore D hardness of 70 and a softening temperature of 130° C. under low load is added 10 parts of 4,4'-thiobis(2-tert-butyl-6-cyclohexylphenol) to prepare a composition of outstanding oxidative stability.

EXAMPLE 9

To the polyethylene in Example 4 is added 0.05 percent of 4,4' - thiobis[2-isopropyl-6-(p-methylcyclohexyl)phenol]. The resulting composition has improved antioxidant characteristics.

EXAMPLE 10

To a polyisobutylene polymer having an average molecular weight of 35,000 is added sufficient 4,4'-trithiobis(2-sec-butyl-6-cyclohexylphenol) to give a composition containing 0.03 percent of the antioxidant. The composition has improved antioxidant properties due to the presence of the additive of this invention.

EXAMPLE 11

A polypropylene is compounded with 0.5 percent of 4,4'-thiobis(6-cyclohexyl-o-cresol) to prepare a stable composition of this invention.

In addition to the antioxidant of this invention the saturated hydrocarbon polymers of this invention may contain other compounded and coloring additives including minor proportions of carbon black, elastomers, polyvinyl compound, carboxylic acid esters, urea-aldehyde condensation products, flame retarding agents such as antimony trioxide and chlorinated hydrocarbons and various pigment compositions designed to impart color to the finished product.

The compounds of this invention may be prepared by reacting the parent phenolic compound [for example, 6-cyclohexyl-o-cresol] with a sulfur chloride. Either sulfur monochloride, $S_2Cl_2$, or sulfur dichloride, $SCl_2$, may be used. In general the products of these reactions are the thiobis phenols of this invention having one or more sulfur atoms between the two phenolic rings. However, the polythiophenols of this invention are also produced by the reaction of a sulfur chloride with the parent phenol.

In general, this reaction is conducted in the presence of solvents. Applicable solvents include low boiling hydrocarbons, halogenated hydrocarbons and inert aromatic compounds such as nitrobenzene. Examples of suitable solvents include carbon tetrachloride, chloroform, n-hexene, 2,4-dibromopentane, low boiling petroleum ether and the like.

Under some conditions the sulfur halide reacts with the starting phenol to form not only the 4,4'-thiobis-substituted phenol but a minor quantity of a p-halogenated product, for example, p-chloro-6-cyclohexyl-o-cresol, when a sulfur chloride is used as the conditioning agent.

The thiobis phenols may be separated from the reaction mixture containing the halogen product and used as pure materials. However, it has also been found that the reaction product of a phenol having the formula

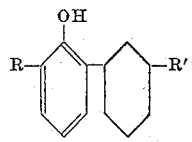

where R and R' are as defined above, and a sulfur halide is an excellent antioxidant additive to many materials and may be used without removing the halogenated product.

The 2,6-di-substituted phenols used as starting materials in the process of this invention may be prepared by reacting a phenol having a hydrogen atom on a carbon atom ortho to the hydroxyl group with a cyclohexene in the presence of an aluminum phenoxide catalyst. For example, 6-cyclohexyl-o-cresol is conveniently prepared by reacting o-cresol with cyclohexene in the presence of a small amount of aluminum o-cresoxide. This process is more fully described in application Serial No. 751,847, filed July 30, 1958.

The following examples illustrate the preparation of the products of this invention.

EXAMPLE 12

A reaction vessel equipped with heating means, reflux condenser and means for charging gaseous and liquid reactants was flushed with nitrogen and charged with 95.2 parts of 6-cyclohexyl-o-cresol and 100 parts of a low boiling petroleum ether. Sulfur dichloride, 26 parts, dissolved in 25 parts of the petroleum ether was added to the phenolic solution with stirring over a 3 hour period while the mixture was heated at reflux. The mixture was then cooled to 10° C. and the pale yellow crystals which separated were collected, washed with water and dried. The initial yield was 83.1 parts of product having a melting point of 105–118° C. Sulfur analysis identified the product as 4,4'-thiobis(6-cyclohexyl-o-cresol) containing some p-chloro-6-cyclohexyl-p-cresol. The analysis showed 7.90 percent sulfur and 0.52 percent chlorine. Theoretical sulfur content is 7.81 percent, recrystallization from benzene gave a purer product melting at 125–126° C.

EXAMPLE 13

Using the reaction equipment of Example 12, 2,6-dicyclohexylphenol was reacted with sulfur dichloride. The reaction equipment was first flushed with nitrogen and was then charged with 646 parts of the phenol dissolved in 750 parts of the petroleum ether. The sulfur dichloride, 130 parts dissolved in 25 parts of petroleum ether was added over a 4 hour period at 43° C. Upon removal of the solvent a good yield of 4,4'-thiobis(2,6-dicyclohexylphenol) compounds are produced as a glass.

By adjusting the reaction time and the relative amount of hexane solvent and by further altering the reaction procedure a product containing varying amounts of sulfur and chlorine may be obtained. In general, the less solvent employed the faster the reaction and for any given amount of solvent a longer reaction time leads to higher concentrations of the halogenated product in addition to higher concentration of di- and trithiobis compounds.

EXAMPLE 14

Following the general procedure of Example 12, 50.8 parts of 2,6-dicyclohexylphenol in 240 parts of nitrobenzene is reacted with 14.8 parts of sulfur monochloride dissolved in 120 parts of nitrobenzene. This reaction produces a good yield of 4,4'-thiobis(2,6-dicyclohexylphenol) compounds which are a mixture of the mono-, di- and trithio compounds.

EXAMPLE 15

The process of Example 14 is repeated using 66.0 parts of 2-tert-butyl-6-cyclohexylphenol as the starting material to produce the thiobis compounds.

EXAMPLE 16

Using 200 parts of ethylene dichloride as a solvent, 60 parts of 2-isopropyl-6-cyclohexyl phenol are reacted with sulfur dichloride. The sulfur dichloride is added as a solution in 100 parts of ethylene dichloride over a 3 hour period while the reaction mixture is maintained at reflux. This reaction produces 4,4'-thiobis[2-isopropyl-6-cyclohexylphenol].

EXAMPLE 17

4,4' - thiobis[2 - (1,1,3,3 - tetramethylbutyl)-6-(cyclohexyl)phenol] compounds of this invention are readily prepared by the reaction at reflux of 64.8 parts of 2-(1,1,3,3 - tetramethylbutyl)-6-(cyclohexyl)phenol with sulfur monochloride. At the end of the reaction the solvent is stripped from the reaction mixture.

EXAMPLE 18

Following the procedure of Example 17 using as a starting material 90 parts of 2-(methylcyclohexyl)-6-sec-eicosyl phenol, the sulfur halide in carbon tetrachloride as a solvent produces 4,4'-dithiobis[2-(methylcyclohexyl)-6-sec-eicosyl phenol].

As the compounds of this invention are outstanding antioxidants, an embodiment of this invention is a new composition of matter which comprises organic material normally tending to undergo oxidative deterioration in the presence of air, oxygen or ozone, containing a small antioxidant quantity, up to about 5 percent, of a compound of this invention as described in Formulas I and II above. A preferred embodiment of this invention consists of organic material containing these compounds in which R in Formula I above is an alkyl group having from 1–4 carbon atoms. In this class of compounds, the particularly preferred compounds are those in which R is a methyl or tertiary butyl group. These compounds are particularly preferred since they tend to exhibit the most desirable properties and are readily prepared.

In addition to hydrocarbon polymers, the compounds of this invention find important utility as antioxidants in a wide variety of oxygen sensitive materials. Thus, liquid hydrocarbon fuels such as gasoline, kerosene and fuel oil are found to possess increased storage stability by the use of an antioxidant of this invention. Likewise, liquid hydrocarbon fuels such as gasoline which contain organometallic additives such as tetraethyllead, as well as other organometallic compounds which are used as fuel additives, attain appreciably increased oxidative stability by the practice of this invention. In addition, lubricating oils and functional fluids, both those derived from naturally occurring hydrocarbons and those synthetically prepared, are greatly enhanced by the practice of this invention. The addition of small quantities of the compounds of this invention to such materials as turbine, hydraulic, transformer and other highly refined industrial oils; waxes, soaps and greases; plastics; synthetic polymers such as polyethylene and polypropylene; organometallic compositions such as tetraethyllead and tetraethyllead antiknock fluids; elastomers, including natural rubber; crankcase lubricating oils; lubricating greases; and the like, greatly increases their resistance to deterioration in the presence of air, oxygen or ozone.

The compounds of this invention are also very useful in protecting petroleum wax—paraffin wax and micro-crystalline wax—against oxidative deterioration. They also find use in the stabilization of edible fats and oils of animal or vegetable origin which tend to become rancid especially during long periods of storage because of oxidative deterioration. Typical representatives of these edible fats and oils are linseed oil, cod liver oil, castor oil, soybean oil, rapeseed oil, coconut oil, olive oil, palm oil, corn oil, sesame oil, peanut oil, babassu oil, butter fat, lard, beef tallow, and the like.

The compounds of this invention are also very effective antioxidants for high molecular weight unsaturated hydrocarbon polymers, such as polybutadiene, methyl rubber, polybutene rubber, natural rubber, butyl rubber, GR–S rubber, GR–N rubber, piperylene rubber, dimethyl butadiene rubber and the like. Thus a preferred embodiment of the present invention is a rubber containing as an antioxidant therefore, a 4,4′-thiobis(2,6-di-substituted phenol) as defined above. Another part of this invention is the method of preserving rubber which comprises incorporating therein a 4,4′-thiobis(2,6-di- substituted phenol) of this invention as defined above. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.01 to about 5.0 percent, based on the rubber.

As used in the description and claims, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta percha, rubbery conjugated diene polymers and copolymers exemplified by the butadiene-styrene (GR–S) and butadiene-acrylonitrile (GR–N or Paracril) rubbers and the like, although the invention is applicable to the stabilization of any rubber, high molecular weight organic material which is normally susceptible to deterioration in the presence of oxygen, air, or ozone. The nature of these rubbers is well known to those skilled in the art.

Among the definite advantages provided by this invention is that the present rubber compositions possess unusually great resistance against oxidative deterioration. Moreover, these compositions exhibit excellent non-staining and non-discoloration characteristics. Furthermore, the novel stabilizers are relatively inexpensive and easily prepared, and possess the highly beneficial property of low volatility. As is well known, a highly desirable feature of a rubber antioxidant is that it have a low volatility so that it remains admixed with the rubber during vulcanization and related process steps.

The rubber compositions of the present invention are illustrated by the following specific examples wherein all parts and percentages are by weight.

EXAMPLE 19

To illustrate the enhanced oxygen resistance of the rubber compositions of this invention and their excellent non-staining and non-discoloration characteristics, a light-colored stock is selected for test. This stock had the following composition:

| | Parts by weight |
|---|---|
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulfur | 3.00 |
| Mercaptobenzothiazole | 1.00 |
| | 181.12 |

To the above base formula is added one part by weight of 4,4′-thiobis(2-cyclohexyl-o-cresol) and individual samples are cured for 20, 30, 45 and 60 minutes at 274° C. using perfectly clean molds with no mold lubricant. Another set of samples of the same base formula which do not contain an antioxidant are cured under the same conditions.

To demonstrate the protection afforded to the rubber by the practice of this invention, the tensile strength and the ultimate elongation of stocks prepared by the addition of the inhibitor are determined before and after aging. These properties are also determined on the inhibitor-free stocks. The aging is accomplished by conducting the procedure of ASTM designation: D–572–52, described in the ASTM Standards for 1952, Part 6, for a period of 168 hours at a temperature of 70° C. with an initial oxygen pressure in the test bomb of 300 p.s.i.g.

The tensile strength and the ultimate elongation of the test specimens before and after aging are measured by ASTM Test Procedure, D–412–51T (ASTM Standards for 1952, Part 6). The tension load per unit cross-sectional area required to break a test specimen, while the ultimate elongation is the elongation at the moment of rupture of a test specimen. A decrease in the values for either of these properties upon aging represents a decrease in the usefulness of the article fabricated therefrom, so that the degree to which these properties are retained is a direct measure of the utility of the protective substance.

Measurements are also made of the increase in weight of the test specimens which occur during the accelerated aging. This is a direct measure of the oxygen up-take of the samples and provides another criterion of the effectiveness of an inhibitor in suppressing oxidative deterioration of the rubber. Thus, the larger the weight increase, the greater is the deterioration and the less effective is the inhibitor.

In all the above tests, the composition compounded with 4,4'-thiobis(2-cyclohexyl-o-cresol) gives results which show this additive to be an excellent antioxidant.

EXAMPLE 20

To a synthetic rubber master batch comprising 100 parts of GR-S rubber having an average molecular weight of 60,000, 50 parts of mixed zinc propionate-stearate, 50 parts of carbon black, 5 parts of road tar, 2 parts of sulfur and 1.5 parts of mercaptobenzothioazole is incorporated 1.5 parts of 4,4'-trithiobis(6-cyclohexyl-o-cresol). This batch is then cured for 60 minutes at 45 p.s.i. of steam pressure.

EXAMPLE 21

Natural rubber stock is compounded according to the following formula:

| | Parts |
|---|---|
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| 4,4'-thiobis[2,6-di(p-methylcyclohexyl)phenol] | 1 |
| Benzothiazyl disulfide | 0.4 |
| Amine activator | 0.5 |

This stock is then vulcanized for 60 minutes at 280° F.

EXAMPLE 22

A butadiene-acrylonitrile copolymer is produced from butadiene-1,3 and 32 percent of acrylonitrile. Two percent (based on the dry weight of the copolymer) of 4,4'-dithiobis[6-(o-isopropylcyclohexyl)-o-cresol] is added as an emulsion in sodium oleate solution to the latex obtained from emulsion copolymerization of the monomers. The latex is coagulated with a pure grade of aluminum sulfate and the coagulum, after washing, is dried for 20 hours at 70° C.

EXAMPLE 23

Three percent of 4,4'-thiobis(2,6-dicyclohexylphenol) emulsified in sodium oleate is added to a rubber-like copolymer of butadiene-1,3 and styrene containing 25 percent of combined styrene.

EXAMPLE 24

A rubber stock is compounded from 100 parts of smoked sheet rubber, 60 parts of zinc oxide, 20 parts of lithopone, 2 parts of sulfur, 0.7 part of diphenyl guanidine phthalate, 0.8 part of benzoyl thiobenzothiazole, 0.2 part of paraffin and 2 parts 4,4'-dithiobis(2-tert-butyl-6-cyclohexylphenol). The stock so compounded is cured by heating for 45 minutes at 126° C. in a press.

EXAMPLE 25

Two parts of 4,4'-thiobis[2-(α-ethyl-4-methylbenzyl)-6-cyclohexylphenol] are incorporated in 100 parts of raw butyl rubber prepared by the copolymerization of 90 percent of isobutylene and 10 percent of isoprene.

EXAMPLE 26

To 200 parts of raw butyl rubber prepared by copolymerization of 95 percent of isobutylene and 5 percent of butadiene is added 1.5 parts of 4,4'-thiobis(2-cyclohexyl-6-tert-amylphenol).

EXAMPLE 27

To a master batch of GR-N synthetic rubber comprising 100 parts of GR-N rubber, 5 percent of zinc stearate, 50 parts of carbon black, 5 parts of road tar, 2 parts of sulfur and 2 parts of mercaptobenzothiazole is added 5 percent based on the weight of the batch of 4,4'-thiobis[6-(p-nonylcyclohexyl)-o-cresol].

EXAMPLE 28

To natural rubber (Hevea) is added 0.1 percent of 4,4'-dithiobis(2,6-dicyclohexylphenol).

Each of the above illustrated rubber compositions of this invention possesses greatly improved resistance against oxidative deterioration as compared with the corresponding rubber compositions which are devoid of an antioxidant. Moreover, the light-colored stocks of the above examples exhibit virtually no discoloration or staining characteristics even when subjected to severe weathering conditions and the like. The methods of formulating the improved rubber compositions of this invention will now be clearly apparent to those skilled in the art.

The amount of stabilizer employed in the rubber compositions of this invention varies from about 0.01 to about 5 percent by weight based on the weight of the rubber. The amount used depends somewhat upon the nature of the rubber being protected and the conditions of service to be encountered. Thus, in the stabilization of natural and synthetic rubber to be used in the manufacture of tires which are normally subjected to exposure to the elements, as well as to the action of sunlight, frictional heat, stress and the like, the use of relatively high concentrations of this inhibitor is advantageous. On the other hand, when the article of manufacture is not to be subjected to such severe conditions, relatively low concentrations can be successfully utilized. Generally speaking amounts ranging from about 0.1 to about 3 percent by weight give uniformly satisfactory results.

Other rubbers and elastomers which can be preserved according to this invention are the rubbery polymerizates of isoprene, butadiene-1,3, piperylene; also the rubbery copolymer of conjugated dienes with one or more polymerizable monoolefinic compounds which have the capability of forming rubber copolymers with butadiene-1,3, outstanding examples of such monoolefinic compounds being those having the group $CH_2=C<$, exemplified by styrene. Examples of such monoolefins are styrene, vinyl naphthalene, alpha methyl styrene, p-chlorostyrene, dichlorostyrene, acrylic acid, methyl acrylate, methyl methacrylate, methacrylonitrile, methacrylamide, methyl vinyl ether, methyl vinyl ketone, vinylidine chloride, vinyl carbazole, vinyl pyridines, alkyl-substituted vinyl pyridines, etc. In fact, excellent stabilization is achieved by incorporating a compound of this invention in any of the well known elastomers which are normally susceptible to deterioration in the presence of air, such as elastoprenes, elastolenes, elastothiomers, and elastoplastics.

As pointed out above, the compounds of this invention are effective antioxidants when added to other organic compositions normally tending to undergo deterioration in the presence of air, oxygen or ozone. The following examples illustrate various embodiments of this aspect of the invention.

Liquid hydrocarbon fuels employed in the operation of spark ignition combustion engines are also vastly improved in their storage stability by the practice of this invention. Table I, below, gives the compositions of a number of typical commercial gasolines which may be stabilized against oxidative deterioration by the inclusion therein of a compound of this invention.

*Table I*

GASOLINE COMPOSITIONS

| Gasoline | Percent aromatics | Percent olefins | Percent saturates | Gravity, ° API |
|---|---|---|---|---|
| A | 26.6 | 20.8 | 52.6 | 62.1 |
| B | 8.6 | 7.9 | 83.5 | 68.5 |
| C | 20.0 | 41.2 | 38.8 | 62.9 |
| D | 20.5 | 32.9 | 46.6 | 63.5 |
| E | 38.1 | 7.3 | 54.6 | 59.3 |

EXAMPLE 29

To 1,000 parts of gasoline A, as described in Table I, is added 10 parts of 4,4'-thiobis[2,6-bis-(p-methylcyclohexyl)phenol].

EXAMPLE 30

To 10,000 parts of gasoline B is added 500 parts of 4,4'-trithiobis(6-cyclohexyl-o-cresol).

EXAMPLE 31

To 10,000 parts of gasoline C is added one part of 4,4'-dithiobis(2,6-dicyclohexylphenol).

Most gasolines in commercial use also contain an organo-metallic antiknock agent and certain scavengers therefor. The antiknock agent most frequently employed is tetraethyllead. The scavengers are ordinarily halohydrocarbon compounds of chlorine and bromine. Most widely used of these are ethylene dibromide and ethylene dichloride. In addition, gasolines often contain other additives such as dyes and phosphorus containing corrective agents. These gasoline compositions containing additives are also protected against oxidative deterioration by the practice of this invention as demonstrated by the following examples.

EXAMPLE 32

To 10,000 parts of gasoline D, which contains 2.39 g./gal. of tetraethyllead and one theory of bromine as ethylene dibromide, is added 100 parts of 4,4'-thiobis[2-isopropyl-6-(m-amylcyclohexyl)phenol].

EXAMPLE 33

To 1,000 parts of gasoline E, which contains 2.47 g./gal. of lead as tetraethyllead, one theory of chlorine as ethylene dichloride, 0.5 theory of bromine as ethylene dibromide and 0.2 theory of phosphorus as tris-($\beta$-chloroisopropyl)-thionophosphate, is added 5 parts of 4,4'-thiobis(6-cyclohexyl-o-cresol).

The tetraethyllead antiknock additive is supplied to oil companies as a mixture already containing the necessary dyes and scavengers. These mixtures, which are commonly known as antiknock fluid compositions, are also protected against oxidative deterioration by the practice of this invention.

EXAMPLE 34

To an antiknock fluid composition which is to be used as an additive to gasoline and which contains 61.5 parts of tetraethyllead, 17.9 parts of ethylene dibromide and 18.8 parts of ethylene dichloride is added with agitation 1.3 parts of 4,4'-dithiobis[2-($\alpha$-methylbenzyl)-6-cyclohexylphenol]. The resulting composition is stable for long periods when exposed to air.

EXAMPLE 35

To 1,000 parts of commercially available diesel fuel having an octane number of 51.7 and a 50 percent evaporation temperature of 509° F. is added 3 parts of 4,4'-thiobis[2 - ($\alpha,\alpha$ - dimethylbenzyl) - 6 - cyclohexylphenol]. The resulting fuel is stable to oxidative deterioration.

The compounds of this invention are also useful in preventing oxidative deterioration in lubricating oil compositions. Thus, an embodiment of this invention is a lubricating oil normally susceptible to oxidative deterioration containing a small antioxidant quantity, up to 5 percent, of a compound of this invention as defined above.

To prepare the lubricants of this invention, an appropriate quantity—from about 0.001 to about 5 percent and preferably from about 0.25 to about 2 percent—of the compound of this invention is blended with the base oil to be protected. Suitable base oils include mineral oils and also synthetic diester oils, such as sebacates, adipates, etc. which find particular use as aircraft instrument oils, hydraulic and damping fluids and precision bearing lubricants. All of these base oils are normally susceptible to oxidative deterioration, especially at elevated temperatures.

The finished lubricants of this invention have much greater oxidation stability and many other improved performance characteristics as compared with the corresponding base oils.

The following examples illustrate the preferred lubricating oil compositions of this invention.

EXAMPLE 36

To 1,000 parts of a solvent refined neutral oil (95 VI and 200 SUS at 100° F.) containing 6 percent of a commercial methacrylate type VI approver which gives the finished formulation of a VI of 140 and a viscosity of 300 SUS at 100° F. is added 5 percent of 4,4'-trithiobis(2-sec-octyl-6-cyclohexylphenol).

EXAMPLE 37

To an additive-free solvent refined crankcase lubricating oil having a viscosity index of 95 and an SAE viscosity of 10 is added 0.001 percent of 4,4'-thiobis[2,6-bis(m-propylcyclohexyl)phenol)].

EXAMPLE 38

To 100,000 parts of a petroleum hydrocarbon oil having a gravity of 30.3° API at 60° F., a viscosity of 178.8 SUS at 100° F., a viscosity index of 154.2 and which contains 0.2 percent sulfur, is added 200 parts of 4,4'-thiobis[2-(cyclohexyl)-6-tert-butylphenol]. The resulting oil possesses greatly enhanced resistance to oxidative deterioration.

EXAMPLE 39

To 100,000 parts of a commercially available pentaerythritol ester having a viscosity at 100° F. of 22.4 centistokes, and known in the trade as "Hercoflex 600" is added 400 parts (0.4 percent) of 4,4'-dithiobis[2,6-bis-(o-butylcyclohexyl)phenol]. The resulting finished oil possesses markedly improved resistance against oxidative deterioration.

EXAMPLE 40

To 100,000 parts of dioctyl sebacate having a viscosity of 210° F. of 36.7 SUS, a viscosity index of 159 and a molecular weight of 426.7 is added 250 parts (0.25 percent) of 4,4'-thiobis[6-cyclohexyl-o-cresol].

To illustrate the benefits obtained by the practice of this invention, a standard oil oxidation test is used. The equipment and test procedure described by Kroger et al., Erdol and Kohle, 2, page 398 (1949), served as a basis for the tests. The equipment and procedures are slightly modified in order to make the oxidizing conditions more strenuous. In this manner the test lubricants are subjected to severe oxidizing conditions in order to conclusively establish the effectiveness of additives under very adverse conditions. Furthermore, the modifications are found to provide results which correlated extremely well with test results of other standard procedures, including actual engine tests.

The equipment consists of a reaction cell connected with an open end manometer whereby the total uptake of oxygen by the oil is determined by noting the drop in height of the mercury in the manometer. The test oil sample is placed in the reaction cell which is then flushed with oxygen and the temperature is then raised and held at that selected for the test until the substrate oil undergoes catastrophic oxidation which is shown by a rapid oxygen uptake. In all cases, the test oil is deliberately contaminated with iron hexoate as an oxidation promoter. In tests of this nature, the oxidation stability of a test lubricant is determined by measuring its induction period, that is, the time required for catastrophic deterioration under the above outlined conditions. The longer the induction period, the more stable the lubricant. In tests of this nature, the lubricants containing an additive of this invention give excellent results.

The compounds of this invention are also useful as additives to functional fluids and automatic transmission fluids.

The primary constituent of a functional fluid is a refined mineral lubricating oil having carefully selected minimum viscosity of 49 Saybolt Universal seconds (SUS) at 210° F. and a maximum viscosity of 7,000 SUS at 0° F., generally a distillate oil, lighter than an SAE 10 motor oil. The oil usually amounts to between about 73.5 to about 97.5 percent by weight of the finished fluid. Preferably the base oil is selected from a paraffin base distillate such as a Pennsylvania crude.

The fluids usually contain compounds which are characterized by containing one or more organic components which may be alkyl, aryl, alkaryl or aralkyl groups that are bonded to one or more metal atoms through coupling groups such as sulfonate, hydroxyl, carboxyl and mercaptan. The metal atoms may be aluminum calcium, lithium, barium, strontium, and magnesium. The organic components contain solubilizing groups such as high molecular weight straight or branched chain paraffins, aromatic or naphthenic rings, or contain a halogen. These metal compounds are present in the compounded fluid in a concentration range of between about 0.1 to about 5 percent by weight. These compounds include alkaline-earth metal salts of phenyl-substituted long chain fatty acids, alkaline-earth metal salts of the capryl or octyl esters of salicylic acid, the alkaline-earth metal salts of petroleum sulfonic acids, the alkaline-earth metal salts of alkyl-substituted phenol sulfides, the salt of aluminum or the alkaline-earth metals with cetyl phenol, and the metal salts of wax-substituted phenol derivatives. Another class of additives are the so-called overbased phenates and sulfonates, which can be prepared by reaction between an alkyl phenol or alkyl phenol sulfide and an alkaline-earth metal oxide or hydroxide at an elevated temperature. The overbased phenate formed from the reaction contains up to two or three times as much metal as the normal phenate.

In addition, functional fluids may contain additional components which improve the properties of the fluid. Typical components and their concentration range in the fluid are as follows:

From about one to about 5 percent of an anti-squawk additive, usually a sulfurized oil, such as sulfurized sperm oil, sulfurized lard, sulfurized vegetable oil, sulfurized glyceride, or a sulfurized ester of fatty acids.

From about 0.05 to about 2 percent of a pour point depressant. Typical types of additives are wax-substituted naphthalenes, esters of wax-substituted phenol, polymerized unsaturated esters and acrylic polymers such as polymerized esters of methacrylic acid.

About 0.005 to about 0.1 percent of a foam inhibitor. Foam inhibitors include fatty acids and fatty acid esters, pine oil, alkyl lactates, higher ethers such as 2-(di-tert-amyl phenoxy) ethanol and mixtures of materials such as glycerol and sodium bis(2-ethylhexyl) sulfosuccinate.

From about 0.03 to about 0.1 percent of a rust preventive such as carboxylic acid derivatives including alkylated succinic acid, esters and partial esters of di- and polycarboxylic acids, esters and partial esters of hydroxy-substituted di- and polycarboxylic acids and alkyl-substituted acids containing at least two carboxylic acid groups joined by nitrogen, oxygen or sulfur esters of acids derived from oxidized petroleum; amine derivatives including hydroxy amines, hydroxy amidines, amine salts of partial esters of phosphorus acids, hydroxy amine salts of oxidized petroleum acids, hydroxy amine salts of fatty acids and long chain alkyl amines; organic sulfonates; long chain alkyl ketones; organic phosphates and phosphites; morpholine derivatives and phosphatides including lecithin and fatty acids.

About 0.1 to about 2 percent of an extreme pressure agent. These include organic compounds containing chlorine, phosphorus and sulfur, such as chlorinated waxes of a $P_2S_5$-terpene reaction product; organic phosphates and phosphites such as for example, tricresylphosphate or a zinc dialkyl dithiophosphate and lead soaps such as lead naphthenate.

From about 0.05 to about 0.2 percent of a metal deactivator. Such compounds include complex organic nitrogen and sulfur-containing compounds, as for example, amines and sulfides. Also included are such compounds as organic dihydroxyphosphines, trialkyl and triaryl phosphites, certain diamines and soaps containing a metal such as tin, nickel, chromium, thallium or titanium.

From about one to about 10 percent of a viscosity index improver such as polymerized olefin or isoolefin, butylene polymer or alkylated styrene polymer.

The following examples show typical functional fluids of this invention. The fluids are formed by mixing the ingredients together, while heating the oil to a temperature up to 200° F.

EXAMPLE 41

A fluid of this invention is prepared by blending 80 parts of a conventionally-refined Pennsylvania mineral oil (99 SUS at 100° F.), 2 parts of 4,4′-trithiobis(2,6-dicyclohexylphenol), 5 parts of barium petroleum sulfonate, 10 parts of a polyacrylate having a molecular weight of approximately 7,000 derived from a fatty alcohol such as cetyl or lauryl alcohol, 0.1 part of a dimethyl silicone polymer anti-foam agent, 2 parts of a dialkyl zinc dithiophosphate and 0.9 part of a dark, viscous liquid having a viscosity of 560 SUS at 210° F., a flash point of 420° F., a pour point of 30° F. and a specific gravity of 60/60° F. of 0.919.

EXAMPLE 42

Another such fluid consists of 95 parts of a solvent-refined, light acid-treated, clay-contacted, solvent dewaxed paraffin base distillate mineral oil (110 SUS at 100° F.); 0.1 part of 4,4′-dithiobis(6-cyclohexyl-o-cresol); 0.1 part of calcium octyl phenol sulfide; 2 parts of a sulfurized sperm oil having a sulfur content between 10–12 percent, a viscosity of 210° F. of 200 SUS and a pour point of 65° F.; 0.3 part of an ester of an aromatic acid and wax-alkylated phenol having a molecular weight of approximately 450; 2.5 parts of a linear pale color isobutylene polymer of a controlled molecular weight having a viscosity of 3,000 SUS at 210° F., a specific gravity 60/60° F. of 0.875.

EXAMPLE 43

An automatic transmission fluid is made by mixing 97 percent of an oil blend comprising 59.0 parts of a solvent extracted, Coastal oil, 40 SUS at 210° F.; 1.0 part of 4,4′-thiobis(2-tert-butyl-6-cyclohexylphenol); 1.0 part of a barium phenol sulfide containing 2.4 percent barium, 2 percent calcium and 3.5 percent sulfur, having a viscosity of 126 SUS at 210° F., a flash point of 430° F., a pour point of 10° F. and a specific gravity 60/60° F. of 0.97; 1.0 part of sulfurized sperm oil.

EXAMPLE 44

96 parts of a conventionally-refined Pennsylvania mineral oil (99 SUS at 100° F.); 2 parts of 4,4′-thiobis(2,6-dicyclohexylphenol); 2 parts of a mixed barium phenol sulfide-calcium sulfonate containing 5.7 percent barium, 0.68 percent calcium and 2.9 percent sulfur, having a viscosity of 92 SUS at 210° F., a flash point of 410° F., a pour point of 10° F. and a specific gravity 60/60° F. of 0.988 are blended into an effective fluid of this invention.

I claim:
1. A compound having the formula:

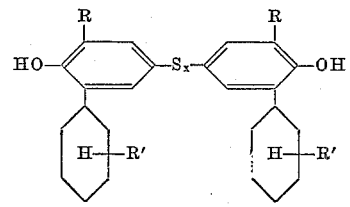

where R is an organic hydrocarbon radical selected from the group consisting of alkyl, cyclohexyl and aralkyl and having from 1 to about 18 carbon atoms, R' is selected from the class consisting of hydrogen and an alkyl radical having from 1 to about 9 carbon atoms, and $x$ is an integer and has a value of from 1–3 inclusive.

2. A compound having the formula:

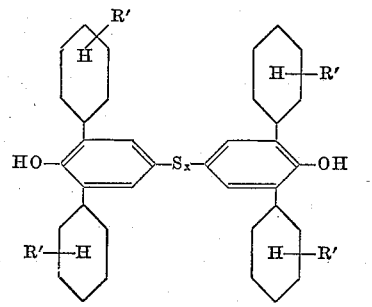

where R' is selected from the class consisting of hydrogen and an alkyl group having from 1 to about 9 carbon atoms, and $x$ is an integer and has a value of from 1–3 inclusive.

3. The compound of claim 1 wherein R is an alkyl group having from 1–4 carbon atoms and R' is hydrogen.

4. A compound of claim 3 where R is a methyl group.

5. 4,4-thiobis(6-cyclohexyl-o-cresol).

6. A compound having the formula:

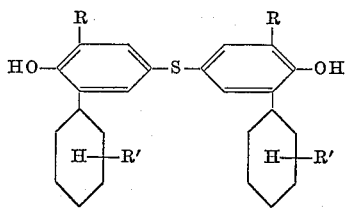

where R is an alkyl group having from 1–4 carbon atoms and R' is hydrogen.

7. A mixture comprising at least two compounds, each having the formula:

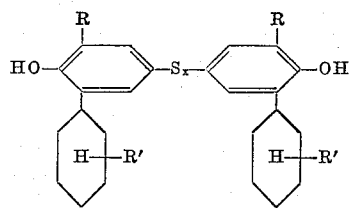

where R is an organic hydrocarbon radical selected from the group consisting of alkyl, cyclohexyl and aralkyl and having from one to about 18 carbon atoms, R' is selected from the class consisting of hydrogen and an alkyl radical having from 1 to about 9 carbon atoms, and $x$ is an integer and has a value of from 1–3 inclusive, such that each compound in said mixture differs only in the integer value of $x$.

References Cited in the file of this patent

UNITED STATES PATENTS

| | | |
|---|---|---|
| 2,160,172 | Rosen et al. | May 30, 1939 |
| 2,675,366 | Pullman | Apr. 13, 1954 |
| 2,802,877 | Hootman | Aug. 13, 1957 |
| 2,810,765 | Neuworth et al. | Oct. 22, 1957 |